Figure 1:
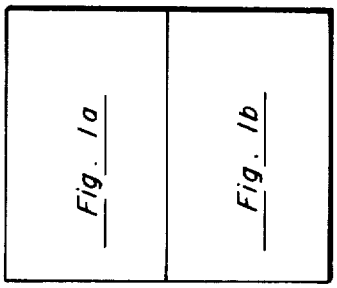
Figure 1A:
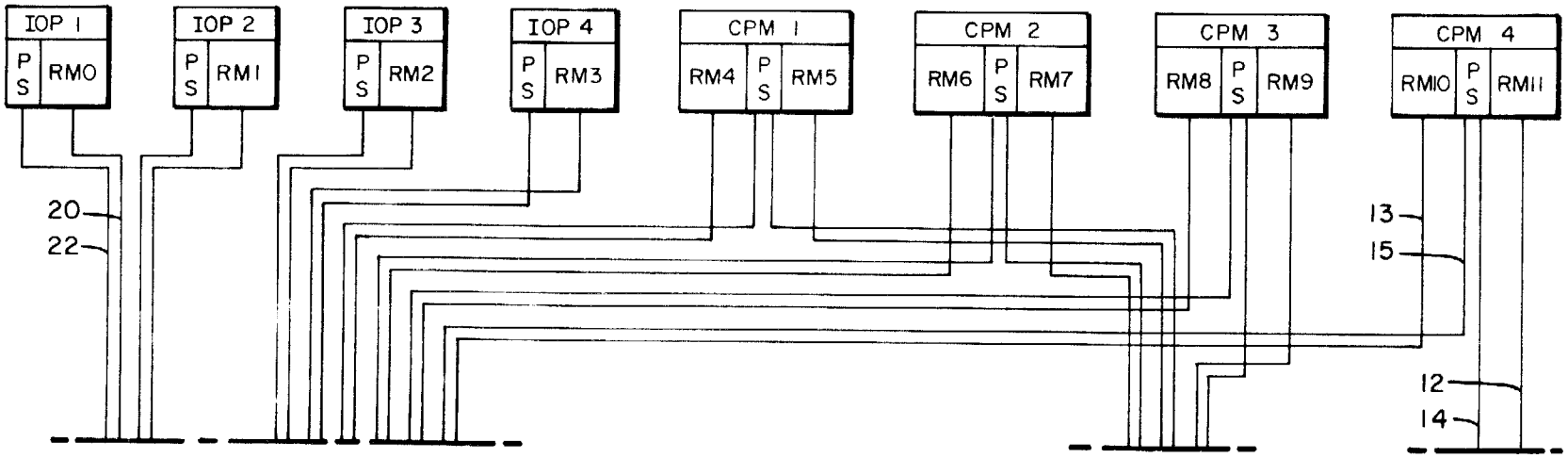
Figure 1B:
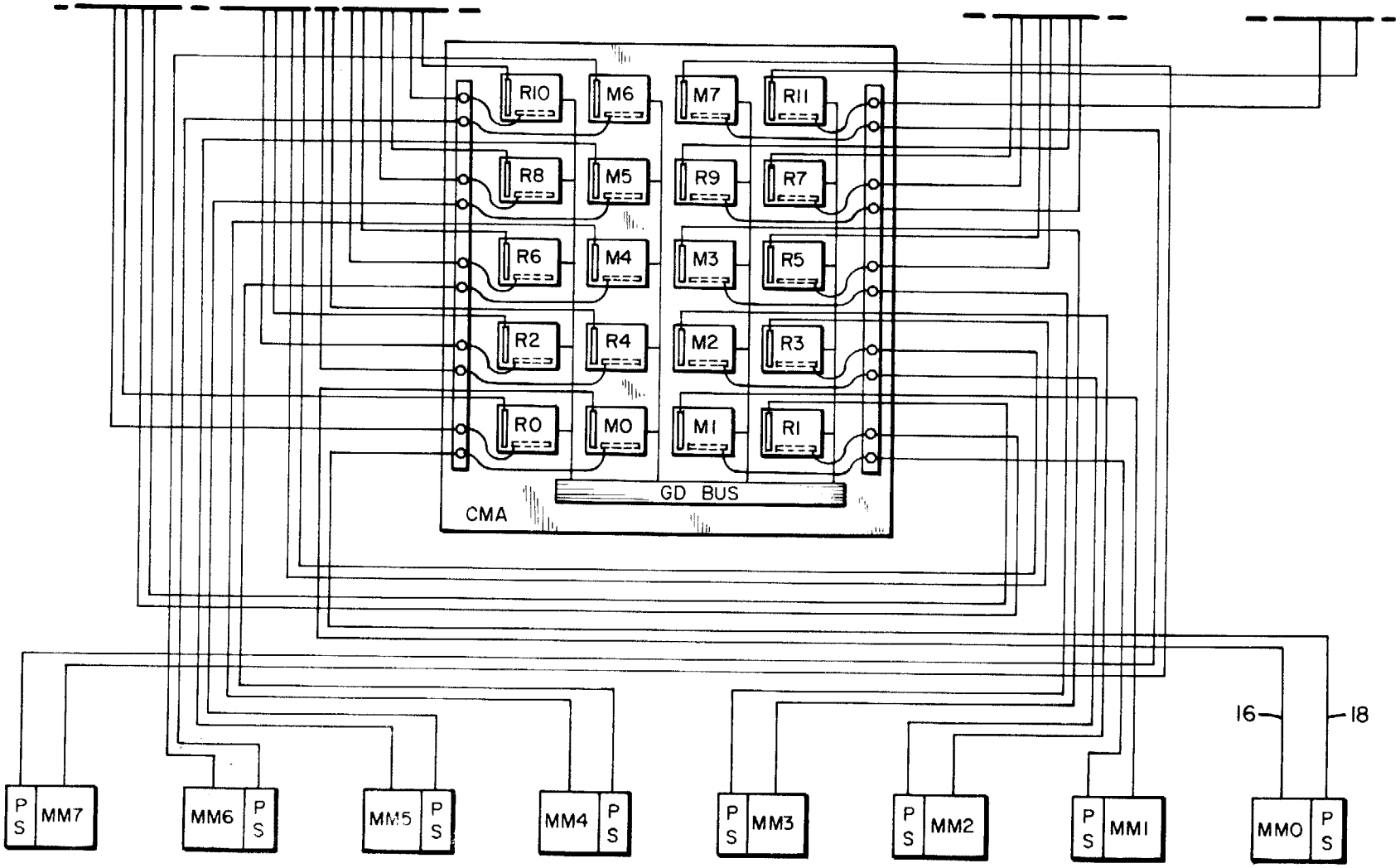
Figure 2:
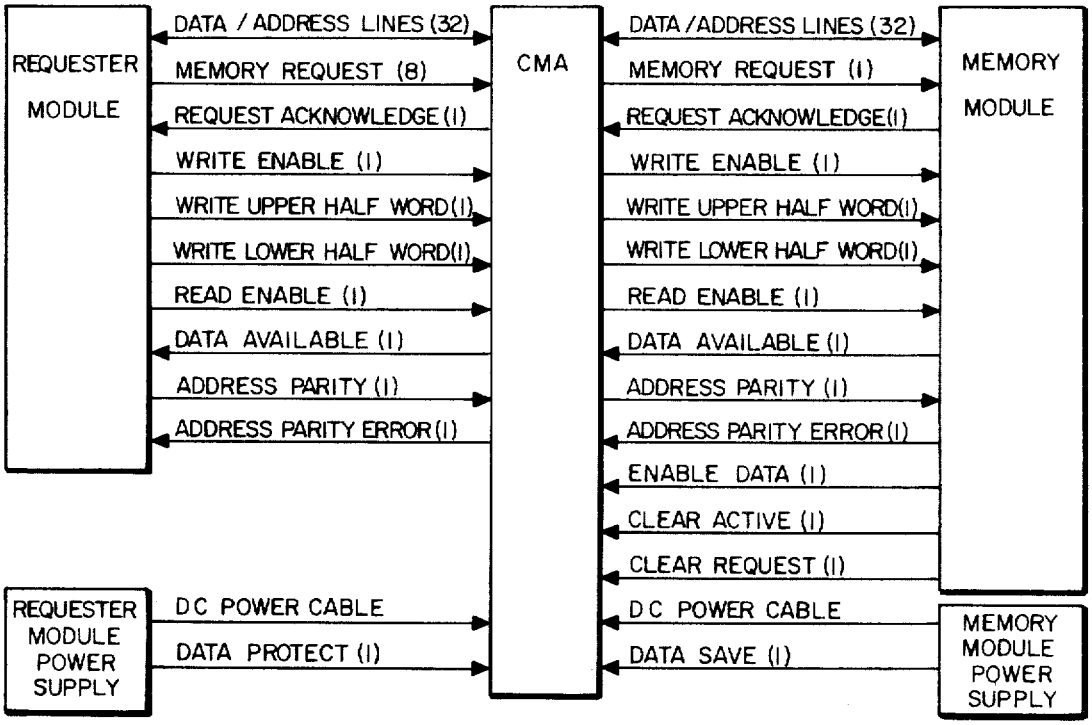
Figure 7:
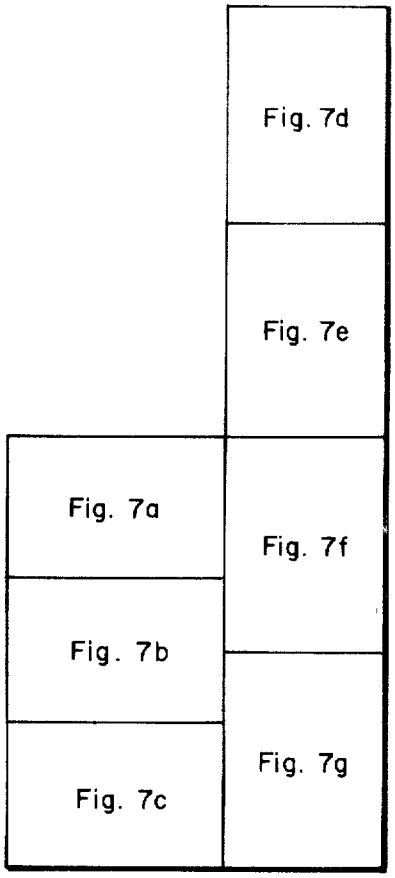
Figure 3:
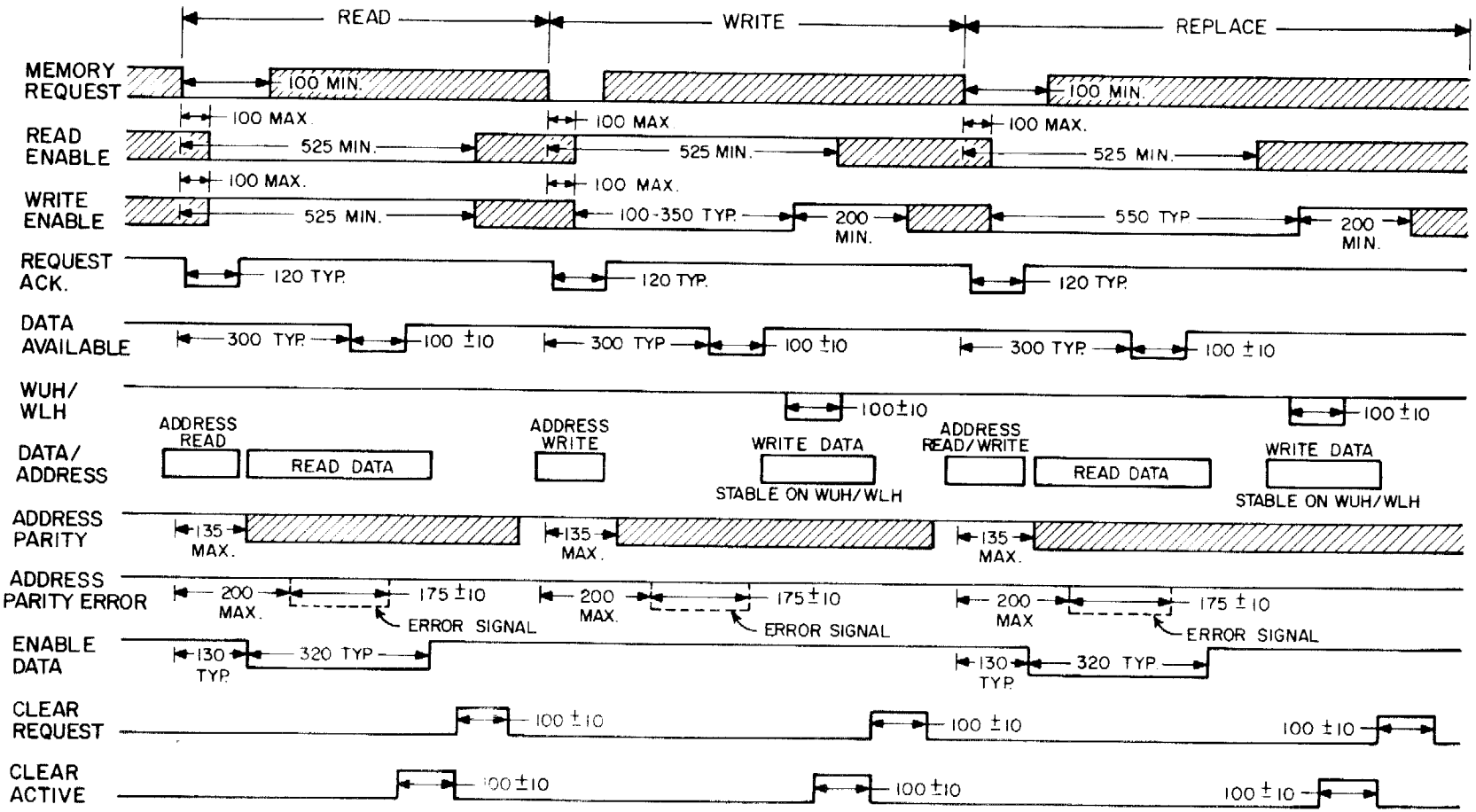
Figure 4:
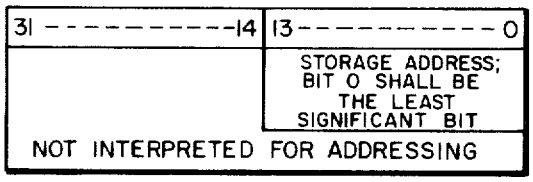
Figure 5:
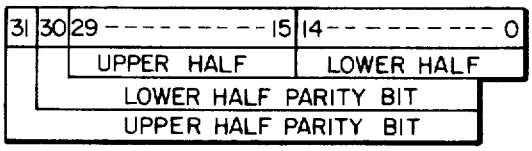
Figure 6:
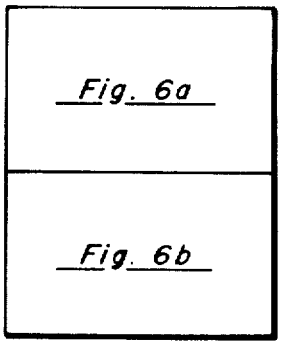
Figure 8:
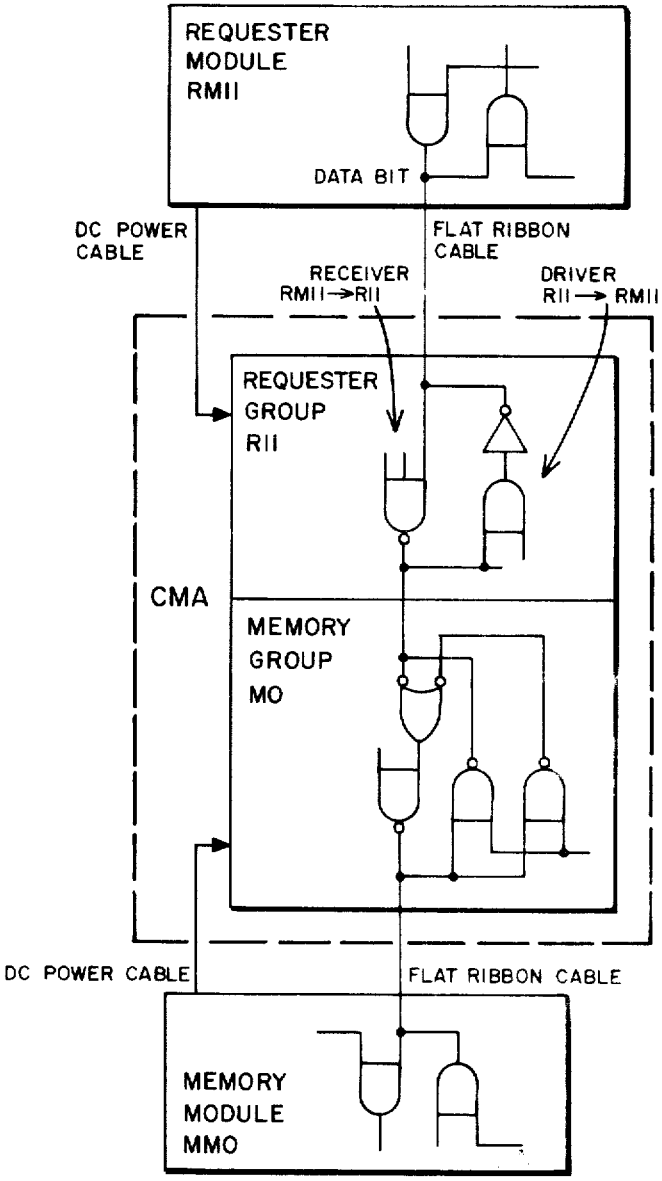
Figure 6A:
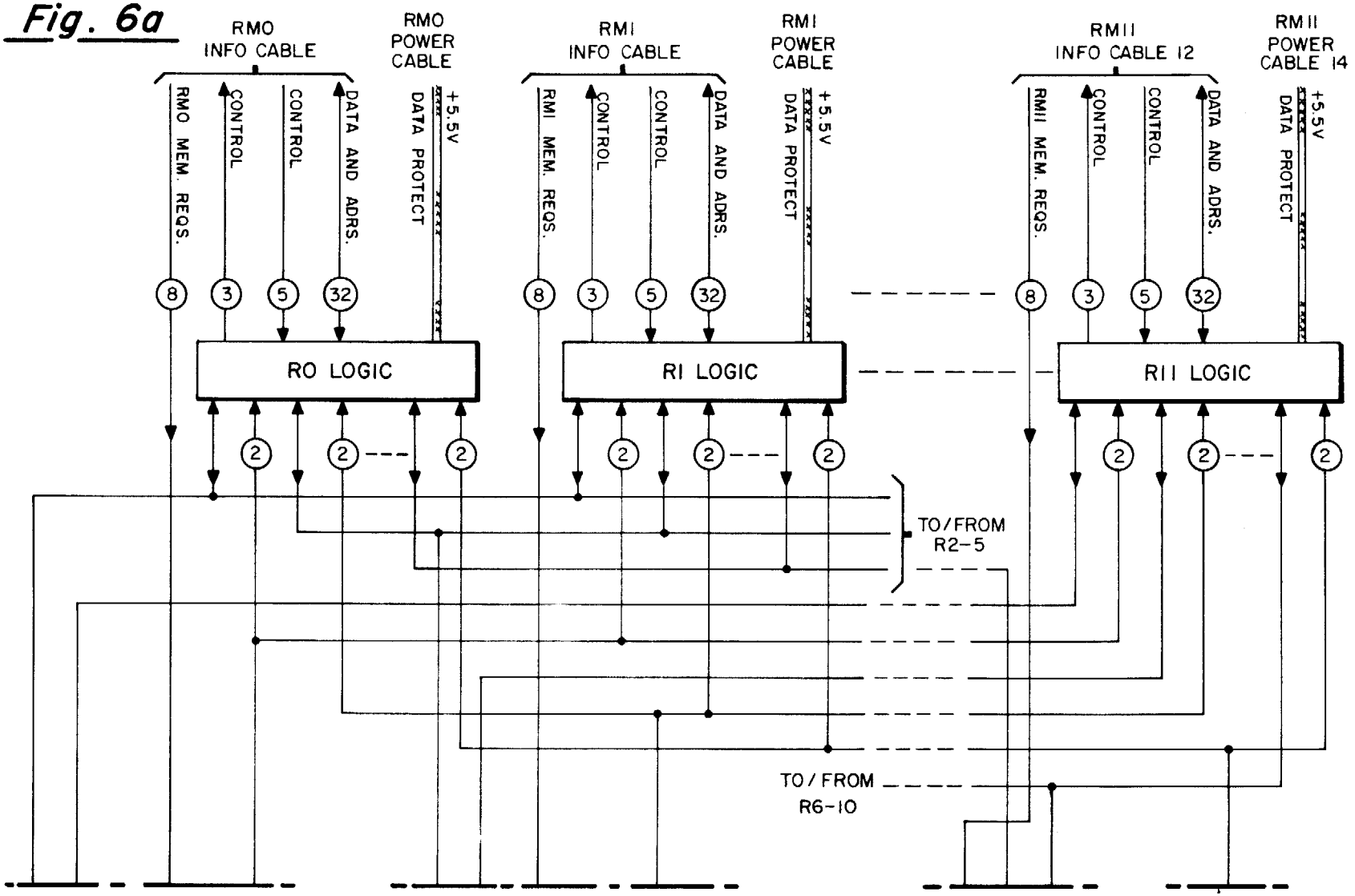
Figure 6B:
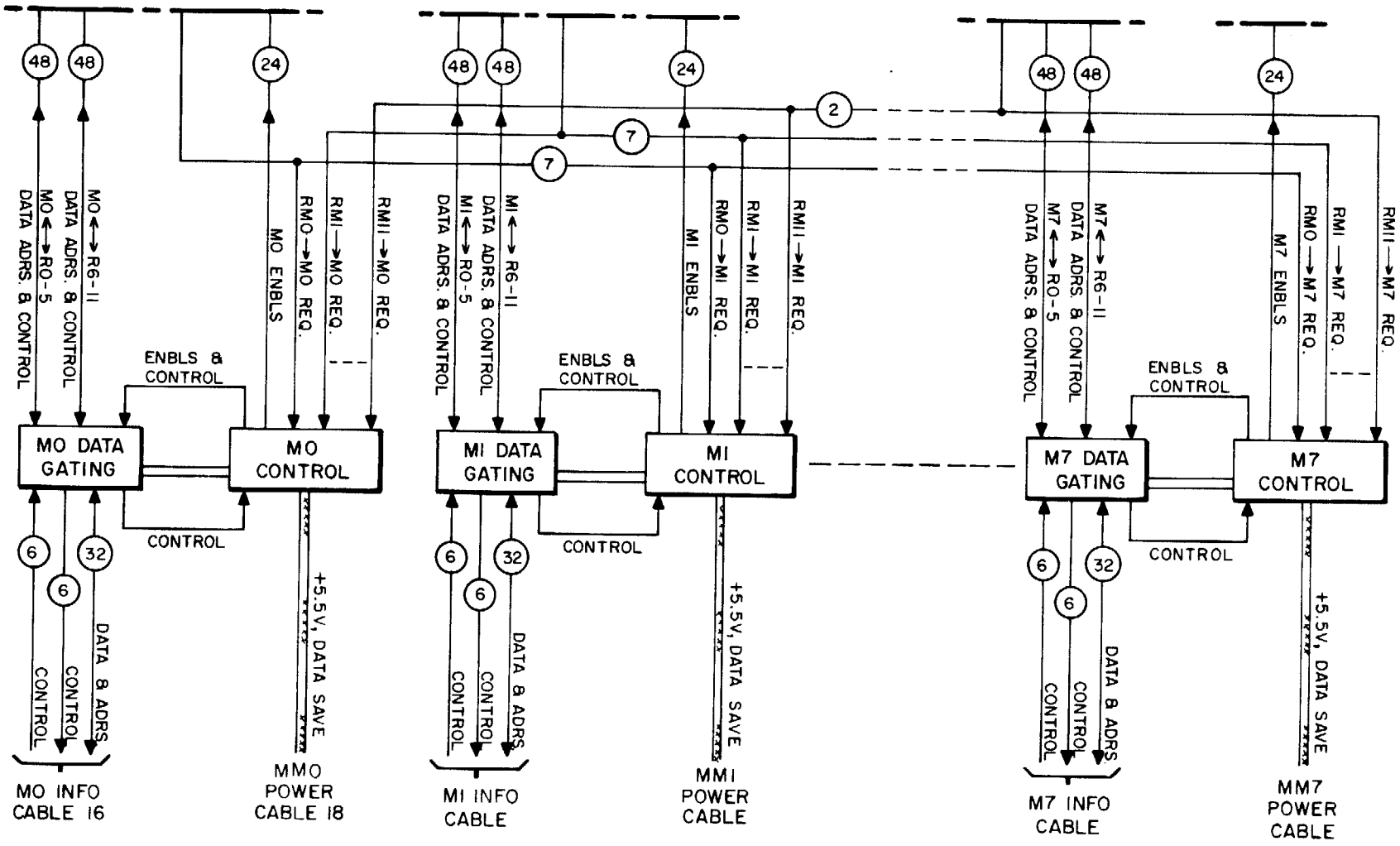
Figure 7A:
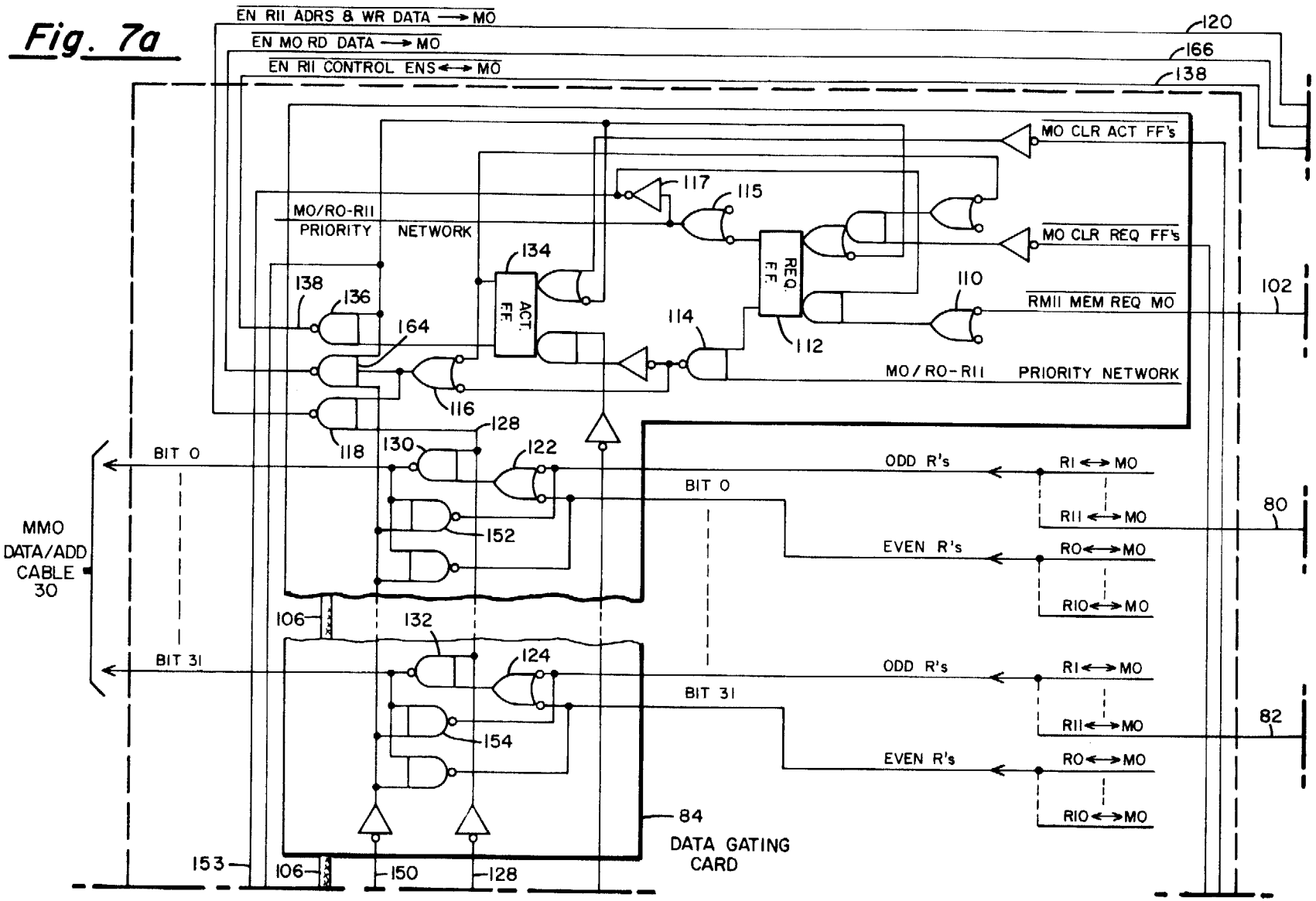
Figure 7B:
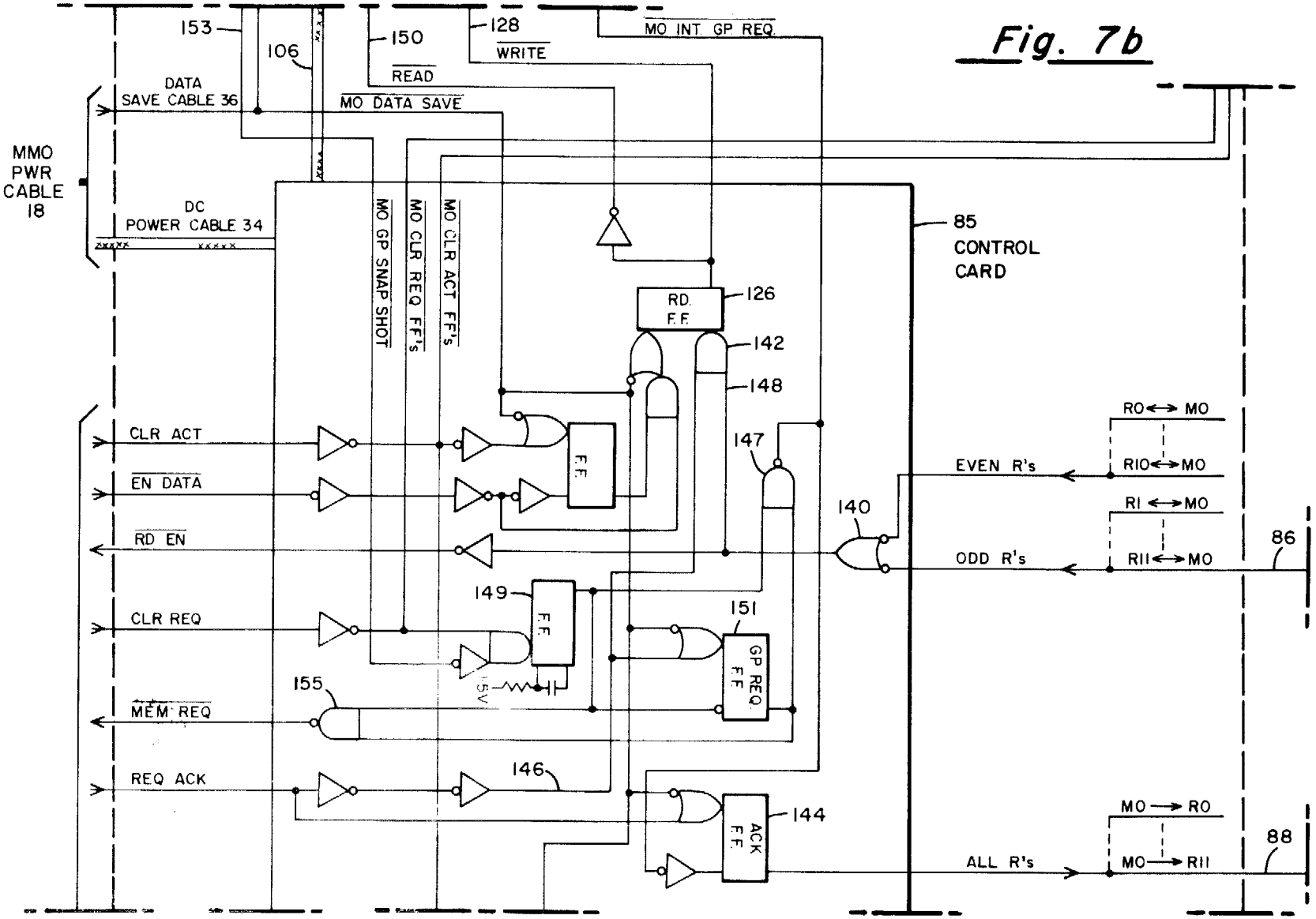
Figure 7C:
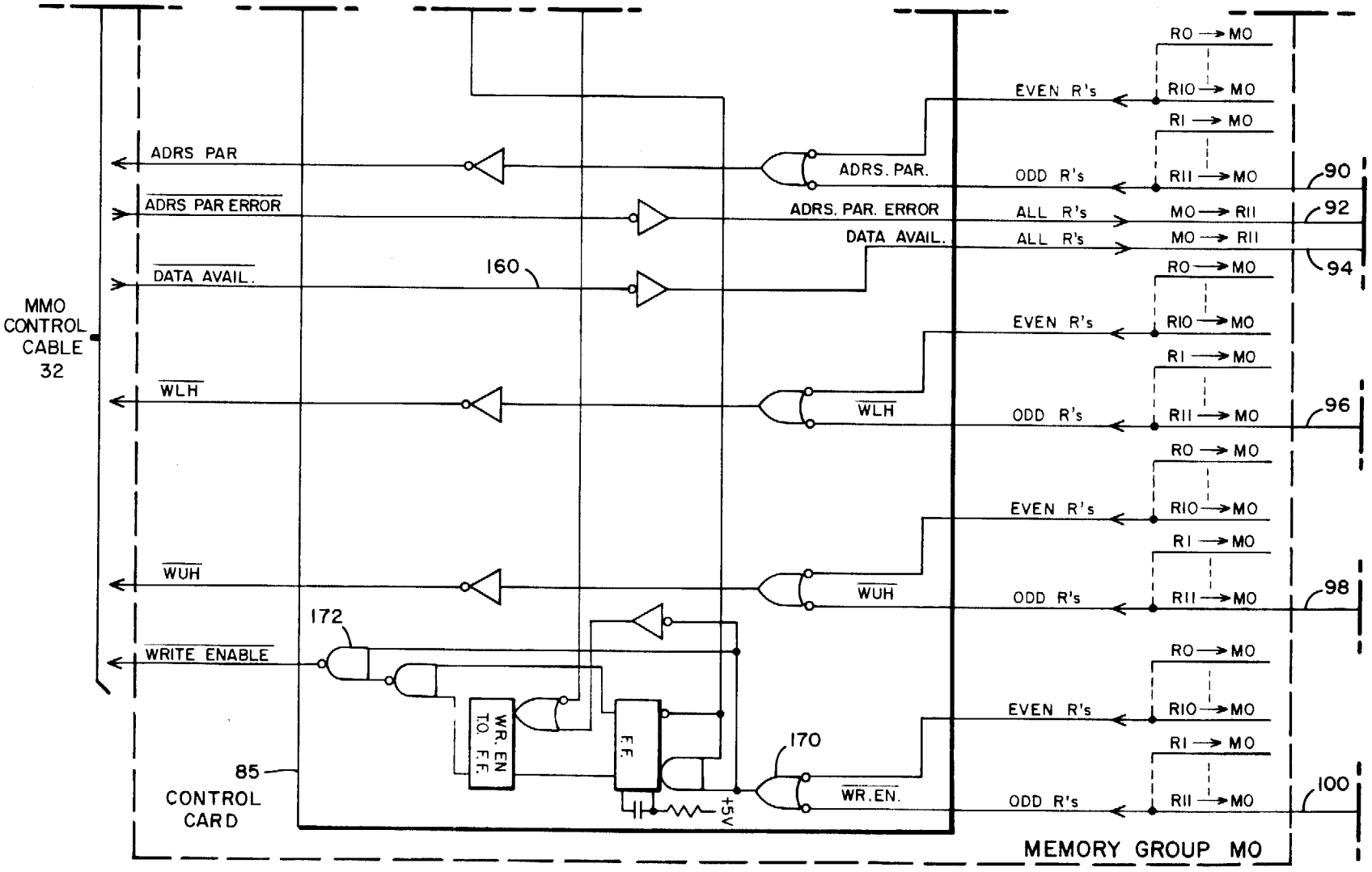
Figure 7D:
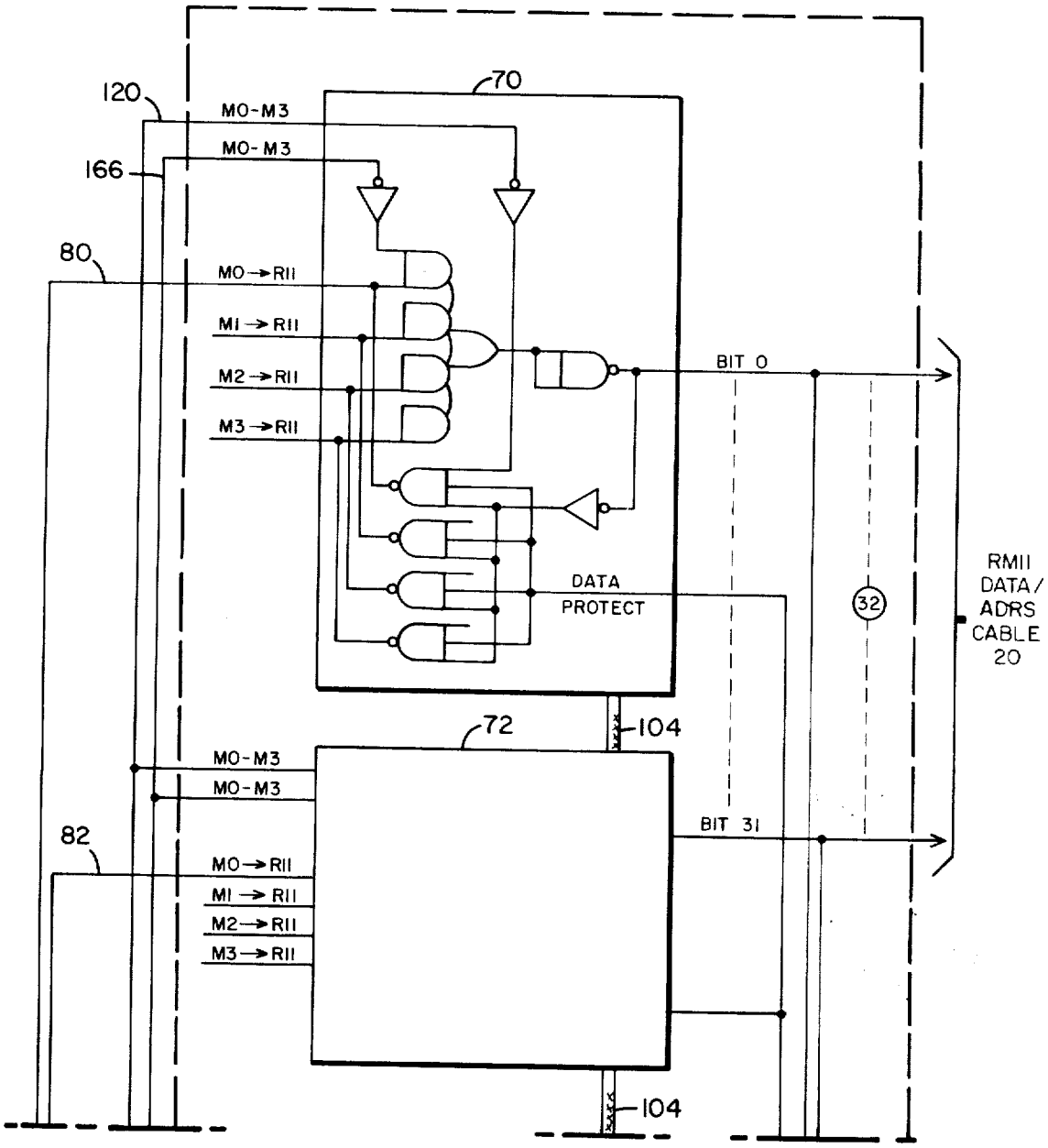
Figure 7E:
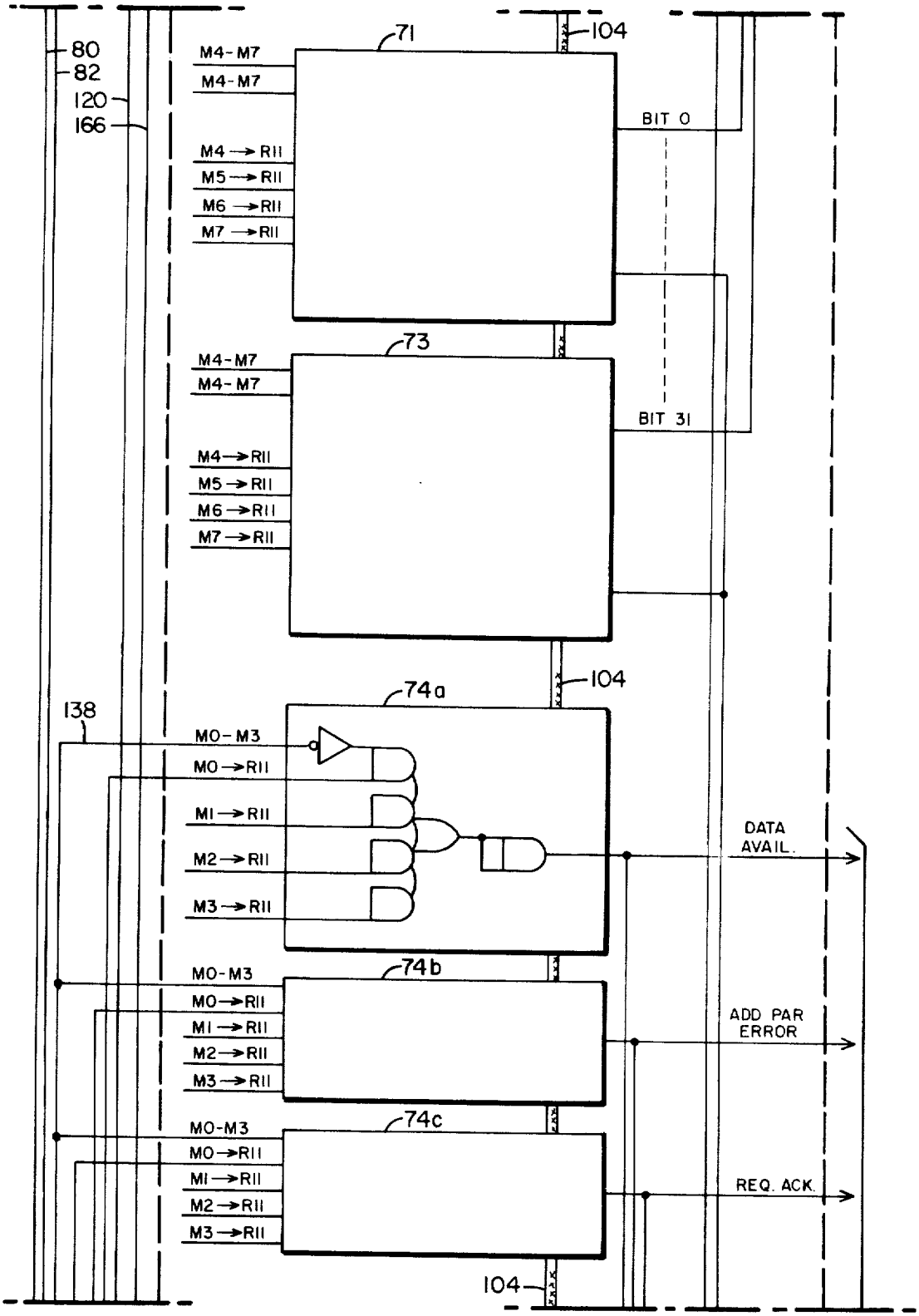
Figure 7F:
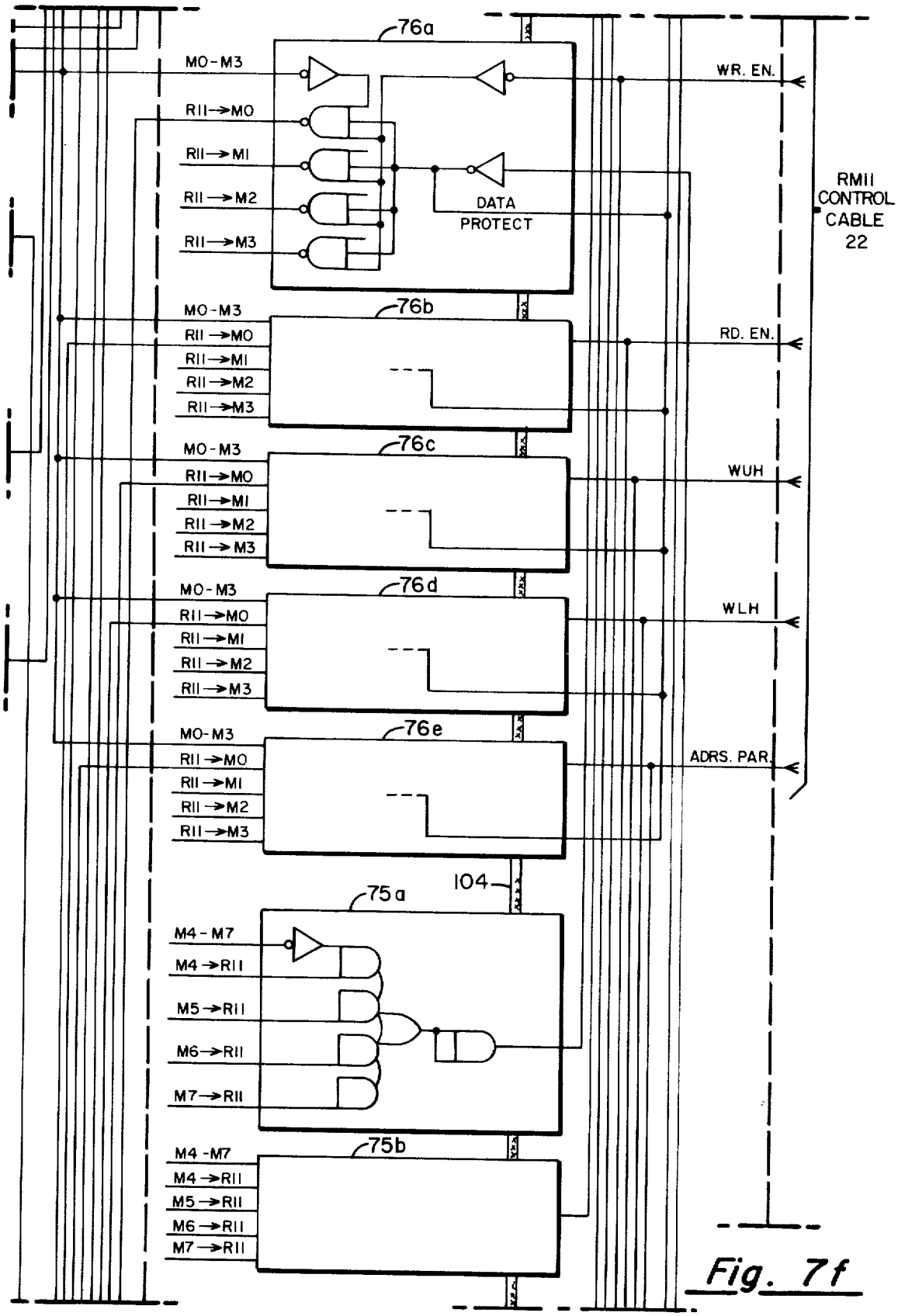
Figure 7G:
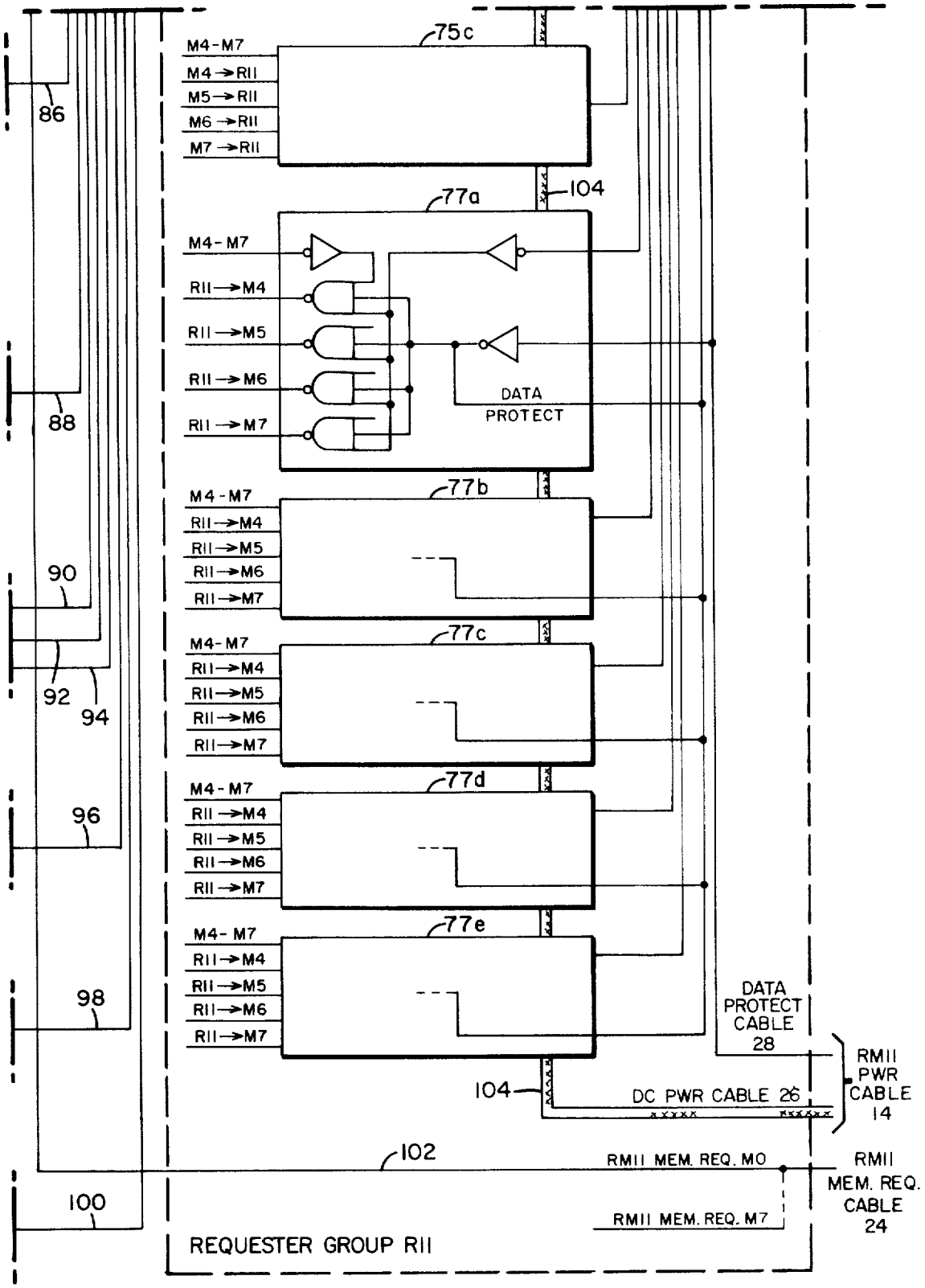

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 9

T917,007

CENTRALIZED MEMORY ACCESS MODULE FOR A DATA PROCESSING SYSTEM

Douglas E. Hair and John A. Bonnes, both of Univac Park, P.O. Box 3525, St. Paul, Minn. 55165

Filed Feb. 14, 1973, Ser. No. 332,526

**Int. Cl. G06f *3/00***

U.S. Cl. 340—172.5

14 Sheets Drawing. 25 Pages Specification

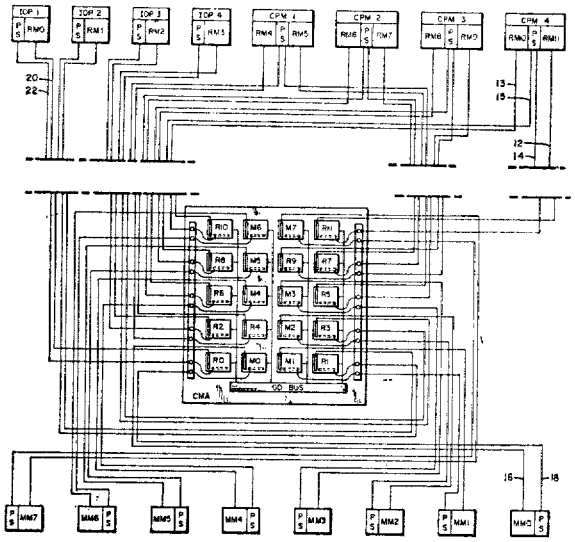

A Centralized Memory Access Module (CMA) that provides a means whereby the associated Data Processing Subsystem (DPS) configuration having up to twelve Requester Modules (RM0–RM11) may be multiplexed or interfaced with up to eight Memory Modules (MM0–MM7) is disclosed. The CMA is comprised of an array of groups of printed circuit cards that are mounted on a single panel for back panel wiring. The CMA is comprised of twelve similar Requester Groups R0–R11 and eight similar Memory Groups M0–M7. Each Requester Module and its associated power supply PS are wired to only its associated Requester Group in the CMA, e.g., RM11 is wired to only R11 in the CMA, and each Memory Module and its associated power supply PS are wired to only its associated Memory Group in the CMA, e.g., MM0 is wired to only M0 in the CMA. Thus, each Requester Module and its associated Requester Group in the CMA and each Memory Module and its associated Memory Group in the CMA are functionally independent of each other such that power failure in one of the modules affects only its associated group in the CMA whereby failure of one or more but not all of the modules does not cause DPS failure. The logic design of the groups that make up the CMA isolate all data, address, control and power signals from each other group and from the other modules while having a common ground bus and intercouples data, address and control signals between one Requester Module and one Memory Module, all under control of the associated Requester Group and Memory Group.

1. ALL TIMES IN NANOSECONDS AT CMA INTERFACE AND ARE SPECIFIED FROM THE ACTIVE (SET) THRESHOLD LEVELS.
2. HIGH SIGNAL LEVEL IS THE INACTIVE (CLEAR) STATE (EXCEPT "CLEAR REQUEST" AND "CLEAR ACTIVE"); LOW SIGNAL LEVEL IS THE SET STATE (EXCEPT "CLEAR REQUEST" AND "CLEAR ACTIVE").
3. SLASH SHADING INDICATES EITHER SET OR CLEAR SIGNAL LEVEL IS APPROPRIATE.

ADDRESS WORD

DATA WORD 86
88
RO↔MO
RIO↔MO
RI↔MO
RII↔MO
MO→RO
MO→RII
EVEN R's
ODD R's
ALL R's
85
CONTROL CARD
140
144
ACK F.F.
GP REQ. F.F.
151
147
126
142
148
RD. F.F.
MO INT GP REQ
F.F.
F.F.
149
146
15V
128
WRITE
150
READ
MO DATA SAVE
MO CLR ACT FF's
MO CLR REQ FF's
MO GP SNAP SHOT
106
155
153
DATA SAVE CABLE 36
DC POWER CABLE 34
CLR ACT
EN DATA
RD EN
CLR REQ
MEM REQ
REQ ACK
MMO PWR CABLE 18